United States Patent
Bhadri et al.

(10) Patent No.: US 12,353,258 B2
(45) Date of Patent: Jul. 8, 2025

(54) SHEET METAL ENCLOSURE WITH AN ARRAY OF EXTRUDED HEAT TRANSFER HOLES

(71) Applicant: Aptiv Technologies AG, Schaffhausen (CH)

(72) Inventors: Shrikant Bhadri, Bengaluru (IN); Ravindra Kulkarni, Bengaluru (IN); Kesav Kumar Sridharan, Bengaluru (IN)

(73) Assignee: Aptiv Technologies AG, Schaffhausen (CH)

( * ) Notice: Subject to any disclaimer, the term of this patent is extended or adjusted under 35 U.S.C. 154(b) by 188 days.

(21) Appl. No.: 17/808,758

(22) Filed: Jun. 24, 2022

(65) Prior Publication Data
US 2023/0415680 A1    Dec. 28, 2023

(51) Int. Cl.
| | |
|---|---|
| *H05K 7/20* | (2006.01) |
| *G06F 1/20* | (2006.01) |
| *H05K 9/00* | (2006.01) |
| *B60R 16/023* | (2006.01) |
| *G06F 1/18* | (2006.01) |
| *G06F 30/10* | (2020.01) |
| *G06F 113/24* | (2020.01) |

(52) U.S. Cl.
CPC ............ *G06F 1/20* (2013.01); *H05K 9/0041* (2013.01); *B60R 16/0239* (2013.01); *G06F 1/181* (2013.01); *G06F 30/10* (2020.01); *G06F 2113/24* (2020.01)

(58) Field of Classification Search
CPC ........ G06F 1/20; G06F 1/181; G06F 2113/24; H05K 9/0041; H05K 9/0026
See application file for complete search history.

(56) References Cited

U.S. PATENT DOCUMENTS

| | | | |
|---|---|---|---|
| 1,680,504 A | 8/1928 | Cutler | |
| 2,214,701 A | 9/1940 | Chester | |
| 3,358,546 A * | 12/1967 | Price | B21K 23/00 |
| | | | 72/267 |

(Continued)

FOREIGN PATENT DOCUMENTS

| | | |
|---|---|---|
| EP | 3189993 B1 | 9/2019 |
| WO | 2011123520 A1 | 10/2011 |

*Primary Examiner* — Kimberley S Wright
(74) *Attorney, Agent, or Firm* — Harness, Dickey & Pierce, P.L.C.

(57) ABSTRACT

Described herein is an enclosure comprising at least one planar portion with an array of extruded holes disposed thereon. The holes are extruded along an axis normal to a plane of the planar portion and configured as apertures for heat transfer through the enclosure. The holes have an inner diameter and have a height along the axis relative to the plane, which provide greater stiffness to the planar portion compared to non-extruded holes. Techniques for producing enclosures with extruded holes such as this are also described. A schematic of an array of extruded holes can be generated by determining, based on a predetermined pilot hole diameter, a thickness of an associated portion of sheet metal, and a hole diameter, an extruded height usable for the extruded holes in the schematic. This may allow for simple conversion from an array of non-extruded thru holes to an array of extruded holes.

15 Claims, 5 Drawing Sheets

(56) References Cited

U.S. PATENT DOCUMENTS

| | | | | |
|---|---|---|---|---|
| 3,365,926 | A * | 1/1968 | Price | B21D 35/00 |
| | | | | 72/283 |
| 5,808,237 | A * | 9/1998 | Hancock | G06F 1/182 |
| | | | | 174/378 |
| 5,928,076 | A * | 7/1999 | Clements | H05K 9/0041 |
| | | | | 174/383 |
| 6,120,118 | A * | 9/2000 | Dean | G06F 1/181 |
| | | | | 361/829 |
| 6,373,696 | B1 * | 4/2002 | Bolognia | G11B 33/128 |
| 7,063,134 | B2 | 6/2006 | Poole et al. | |
| 8,197,982 | B2 | 6/2012 | Haltiner, Jr. et al. | |
| 10,375,866 | B2 | 8/2019 | Jun | |
| 2004/0233654 | A1 * | 11/2004 | Lin | H05K 9/0041 |
| | | | | 361/818 |
| 2011/0297349 | A1 * | 12/2011 | Zhou | G06F 1/20 |
| | | | | 165/67 |
| 2014/0124177 | A1 | 5/2014 | Reis et al. | |
| 2016/0356559 | A1 * | 12/2016 | Krug, Jr. | B23P 15/26 |

\* cited by examiner

SHEET METAL ENCLOSURE WITH AN ARRAY OF EXTRUDED HEAT TRANSFER HOLES

BACKGROUND

Many sheet metal enclosures (e.g., electrical enclosures) have arrays of holes or cutouts on one or more sides which facilitate heat dissipation from components within the enclosures. One drawback of such holes is a reduction in a structural stiffnesses of plates in which they are disposed. To compensate, the thickness of the plate is often increased or other stiffening means (e.g., ribs, shelfs, jogs) are added to the plate to increase the stiffness. Mitigating the lower stiffness in such ways may add additional costs and/or consume space that may otherwise be used for more cooling holes, smaller overall packaging, or other features.

SUMMARY

This document is directed to a sheet metal enclosure with an array of extruded heat transfer holes and associated methods. Some aspects described below include an enclosure. The enclosure comprises one or more planar portions of sheet metal having corresponding planes. The enclosure also comprises an array of extruded holes in a planar portion of sheet metal. The extruded holes have an inner diameter, are configured as apertures for heat transfer through the enclosure, are extruded along an axis normal to a plane of the planar portion; and have a height along the axis relative to the plane.

Some aspects described below include a method. The method comprises obtaining a hole diameter and hole locations for an array of holes through a portion of sheet metal. The method further comprises determining, based on a predetermined pilot hole diameter, a thickness of the portion of sheet metal, and the hole diameter, an extruded height usable for the holes. The method also comprises generating a schematic of the holes as extruded holes having the hole diameter and the extruded height and outputting the schematic.

This Summary introduces simplified concepts of a sheet metal enclosure with an array of extruded heat transfer holes that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

A sheet metal enclosure with an array of extruded heat transfer holes and associated methods are described with reference to the following drawings, which may use some of the same numbers throughout to reference like or examples of like features and components.

DETAILED DESCRIPTION

Overview

Enclosures often have arrays of holes or cutouts on one or more sides which facilitate heat dissipation from components within the enclosures. While the holes may enable heat transfer, they may also cause the sides to be less structurally stiff compared to enclosures without holes. Conventional means of strengthening sides with heat transfer holes often involves adding features which can increase cost, complexity, and/or wasted space within the enclosures.

Described herein is an enclosure comprising at least one planar portion with an array of extruded holes disposed thereon, as opposed to other types of non-extruded holes, e.g., thru holes. Unlike simple holes, the extruded holes described herein have an inner diameter, are configured as apertures for heat transfer through the enclosure, are extruded along an axis normal to a plane of the planar portion, and have a height along the axis relative to the plane. The enclosure may be configured for an automotive environment to house, for example, Electronic Control Units (ECUs) or Electronic Control Modules (ECMs, heat exchangers, electrical components, mechanical components, fluid components, or any combination thereof. A heat transfer is facilitated by the enclosure to cool the components housed within the enclosure.

The extruded holes increase stiffness to the planar portion compared to a similar planar portion with non-extruded holes. For example, the planar portion may have an increased natural frequency or an increased stiffness expressed as Newtons per meter. By having an increased stiffness, the enclosure may allow for similar cooling (actually slightly better do the increased surface area of the planar portion) while increasing environmental viability compared to a similar enclosure with simple (i.e., non-extruded) thru holes.

Also described herein is a method of generating a schematic of an array of extruded holes comprising determining, based on a predetermined pilot hole diameter, a thickness of an associated portion of sheet metal, and a hole diameter, an extruded height usable for the extruded holes and outputting a schematic of the holes as extruded holes. The method allows for easy conversion from an array of simple thru holes to an array of extruded holes or for generation of an array of extruded holes. Doing so enables part designers to quickly produce schematics incorporating arrays of extruded holes, thereby allowing for increased productivity and variability in product design.

Example Environment

Figure 1:
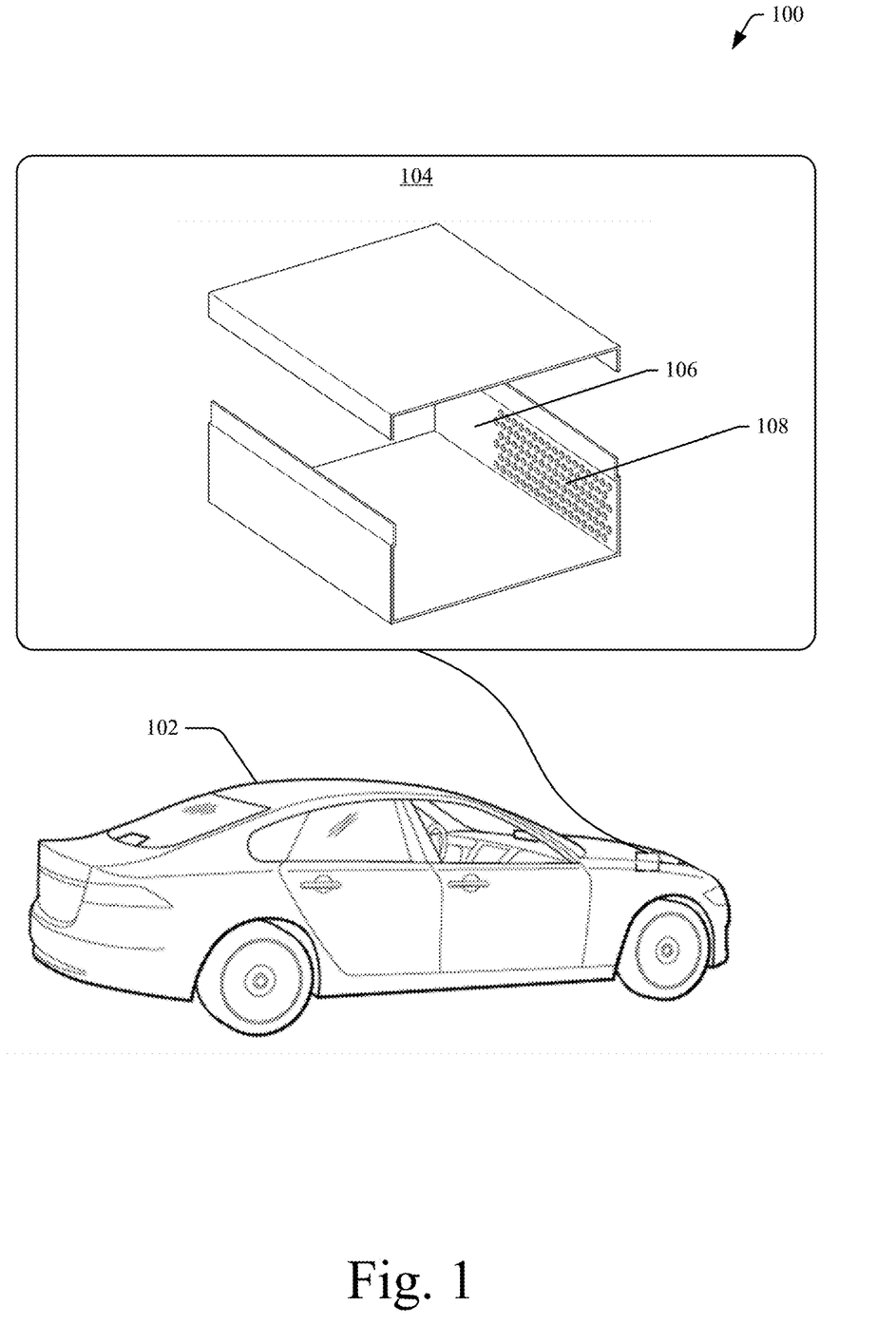
FIG. 1 illustrates, in accordance with this disclosure, an example environment where a sheet metal enclosure with an array of extruded heat transfer holes may be implemented.

FIG. 1 illustrates an example environment 100 where a sheet metal enclosure with an array of extruded heat transfer holes may be implemented. The example environment 100 contains a vehicle 102. The vehicle 102 may be any vehicle type (taxi, car, truck, motorcycle, e-bike, boat, air vehicle, and so on). The vehicle 102 contains an enclosure 104 that is configured to house one or more components (e.g., mechanical, electrical, and/or thermal components) that may generate heat which should be carried away or that are configured to receive heat from outside the enclosure 104.

The enclosure 104 is made of sheet metal and has one or more planar portions (e.g., planar portion 106). The planar portion 106 has an array of extruded holes 108. The array of extruded holes 108 enables convective heat transfer into or out of the enclosure (e.g., transfer heat from the components within the enclosure 104 to a surrounding environment). The array of extruded holes 108 also allows for the corresponding planar portion to have an increased stiffness (e.g., the planar portion may have a higher natural frequency) compared to a planar portion with non-extruded holes.

Although shown as being disposed within a vehicle 102, it should be noted that the enclosure 104 may be any type of material enclosure where strengthening of a planar portion may be beneficial. For example, the enclosure 104 may be configured for a residential environment, commercial environment, mobile or stationary environment, marine environment, and/or space environment. Furthermore, the array of extruded holes 108 may be implemented in a piece of sheet metal that is not part of an enclosure or in a material other than sheet metal (e.g., plastic).

Example Array of Extruded Holes

Figure 2:
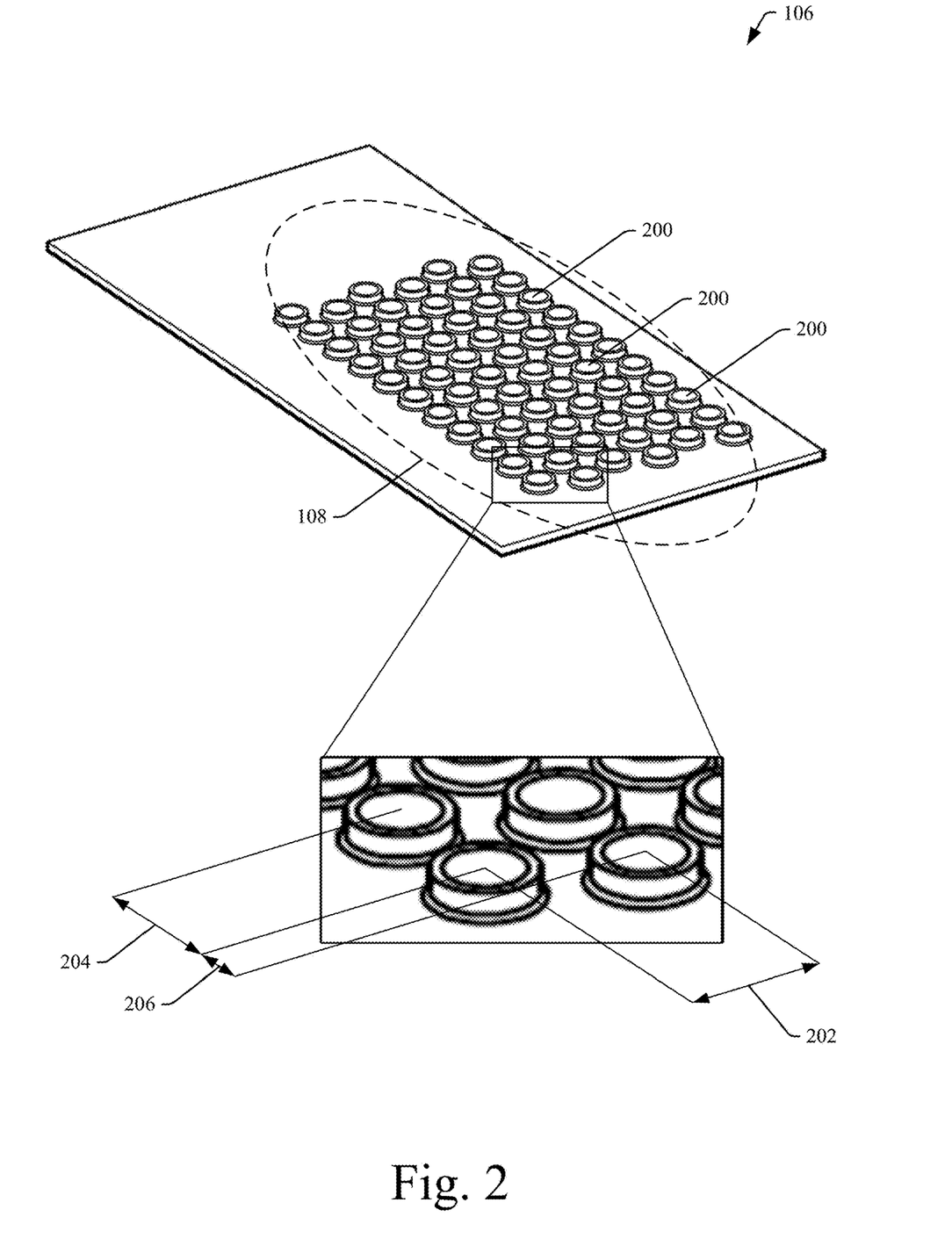
FIG. 2 illustrates, in accordance with this disclosure, a detailed view of the array of extruded holes of FIG. 1.

FIG. 2 illustrates the planar portion 106 with the array of extruded holes 108. The array of extruded holes 108 contains a plurality of extruded holes 200 arranged in an array. The array may have a rectangular shape, as illustrated. Alternatively, or in combination, the array may be circular, polygonal, freeform, or any combination thereof (including rectangular). Although described as being disposed on a planar portion 106, the array of extruded holes 108 may also be disposed on a curved or complex surface (e.g., formed after the extruded holes 200 have been extruded).

In the illustrated example, the extruded holes 200 are in a rectangular array. The extruded holes 200 have a first spacing 202 in a first direction and a second spacing 204 in a second direction that is perpendicular to the first direction. There is also an offset 206 in the second direction relative to rows of the extruded holes 200. It should be noted that the configuration and spacing of the extruded holes 200 in the planar portion 106 is an example, and other patterns and/or spacing may be used without departing from the scope of this disclosure.

The extruded holes 200 may extend into the enclosure 104 (e.g., the extruded holes 200 are extruded such that the planar portion 106 is flush on the outside of the enclosure 104). Doing so may enable increased safety and ergonomics due to a rough surface (e.g., that with raised extrusions) being on the inside of the enclosure 104. Alternatively, the extruded holes 200 may extend away from an interior of the enclosure 104 (e.g., the extruded holes 200 are extruded such that the planar portion 106 is flush on the inside of the enclosure 104). To mitigate any potential safety issues, the extruded holes 200 may be deburred or otherwise removed of any sharp edges.

Example Extruded Hole

Figure 3:
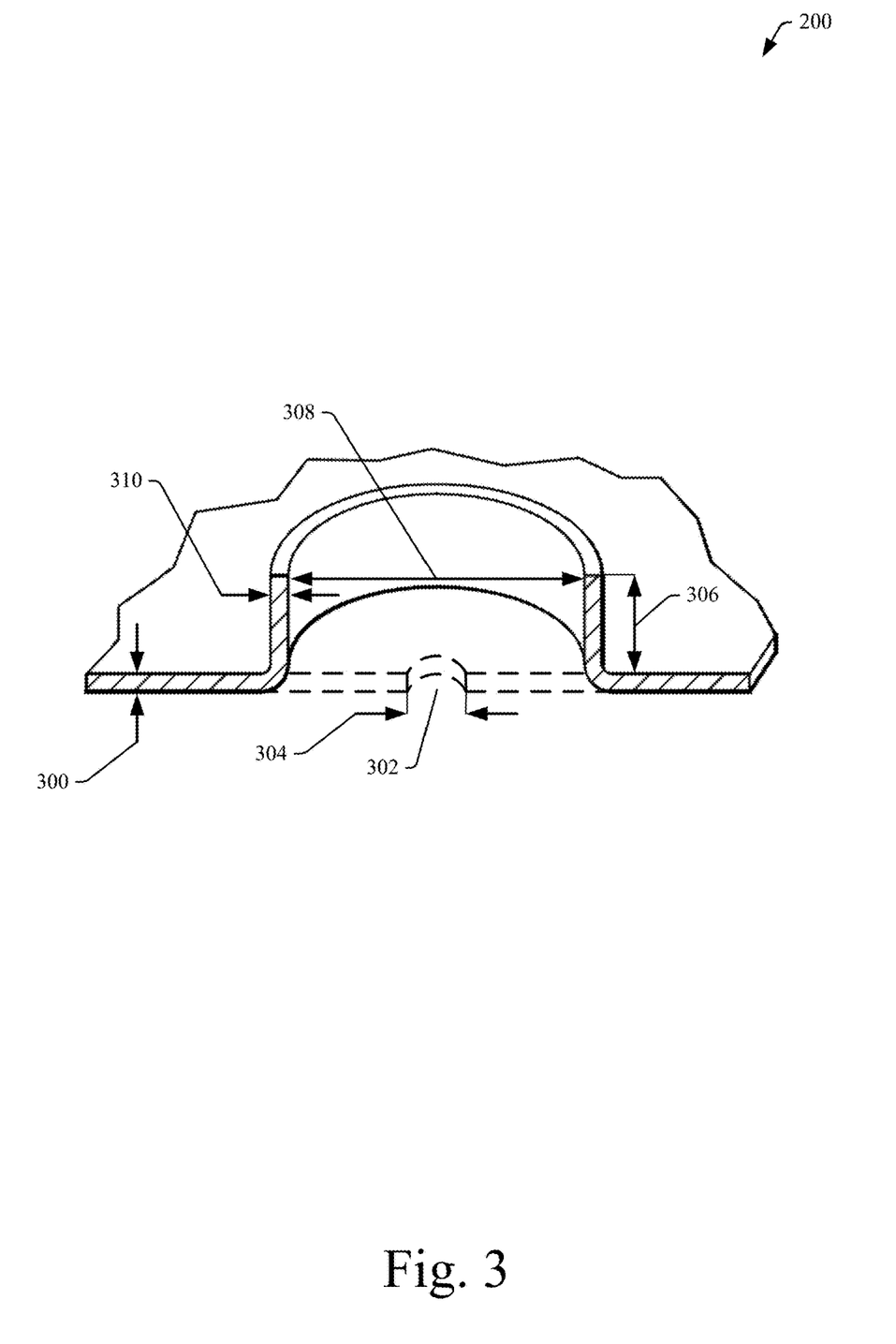
FIG. 3 illustrates, in accordance with this disclosure, a detailed view of one of the extruded holes of FIGS. 1 and 2.

FIG. 3 illustrates a cross section of one of the extruded holes 200. Prior to forming the extruded hole 200, the planar portion 106 has a sheet metal thickness 300. To form the extruded hole 200, a pilot hole 302 may first be placed through the planar portion 106. The pilot hole 302 has a pilot hole diameter 304. The pilot hole diameter 304 may be pre-determined and/or correspond a minimum allowable diameter (per industry, company, trade, and/or manufacturing standards). The smaller the pilot hole diameter 304, the more material available for the extrusion. For example, the pilot hole diameter 304 may be as small as 2 mm. It should be noted that, in some implementations, the pilot hole 302 may not be necessary to form the extruded holes 200.

To determine a height 306 of the extruded hole, a conservation of mass function may be used. For example, the conservation of mass function may be used to determine a maximum allowable height for the height 306 based on an amount of material available between the pilot hole 302 and an inner diameter 308 of the extruded hole (e.g., the desired hole diameter after extrusion). Equation 1 may be used to determine a maximum allowable or available height for the height 306:

$$h = \frac{\left[\left(\frac{d_h}{2}\right)^2 - \left(\frac{d_p}{2}\right)^2\right]t_p}{\left[\left(\frac{d_h + 2t_h}{2}\right)^2 - \left(\frac{d_h}{2}\right)^2\right]} \tag{1}$$

In Equation 1, h is the height 306, $d_h$ is the inner diameter 308, $d_p$ is the pilot hole diameter 304, $t_p$ is the sheet metal thickness 300 of the planar portion 106, and $t_h$ is a wall thickness 310 of the extruded hole 200.

The wall thickness 310 may be selected as the sheet metal thickness 300 (e.g., material stretching is not desired or allowable). Alternatively, if material stretching is desired or allowable, the wall thickness 310 may be less than the sheet metal thickness 300. Furthermore, a height may be selected (e.g., one and a half times the sheet metal thickness 300) and checked to see if the height is viable (e.g., if there is enough available material to support it).

Example Drop Indication

Figure 4:
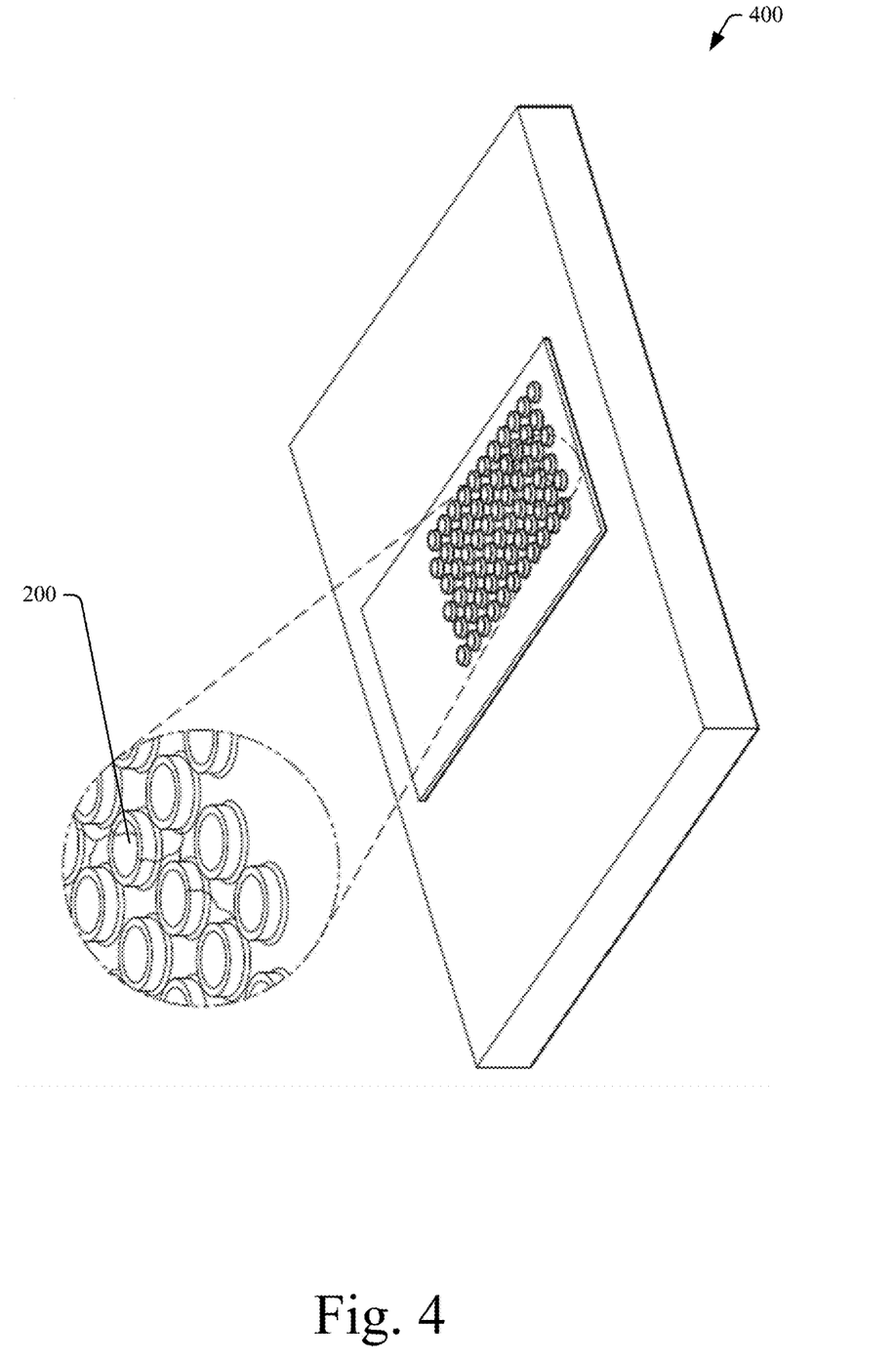
FIG. 4 illustrates, in accordance with this disclosure, an example of a dropped or damaged enclosure.

FIG. 4 is an example illustration 400 of a visual indication of a drop, misuse, or failure of the planar portion 106. Although only the planar portion 106 is shown, it should be noted that a similar indication would exist on the planar portion 106 as a portion of the enclosure 104. In other words, only the planar portion 106 is illustrated for simplicity.

The extruded holes 200 provide for a stress concentration within the planar portion 106. As such, given a stress or shock load, the extracted holes 200 may absorb or receive an increased stress compared with the rest of the planar portion 106. For example, if the enclosure 104 is dropped, mishandled, or otherwise exposed to a load that may render the enclosure 104 compromised (e.g., prior to installation, during repair), the extruded holes 200 may visually fail (e.g., split, crack, break). In other words, a mishandling of the enclosure 104 may cause the extruded holes 200 to introduce failure than can be identified visually by the naked eye. Conventional holes may not provide enough stress concentration to visually fail (e.g., they may simply yield). Thus, an added benefit of extruded holes vs conventional holes is that they may provide for a visual indication of a dropped, broken, or misused enclosure. The visual indication allows for easy failure identification and discernment of damaged enclosures such that parts (including the enclosure 104 and/or any internal components) may be disqualified (e.g., not be placed in a vehicle and/or reach an end user/customer) due to mishandling events.

Example Method

Figure 5:
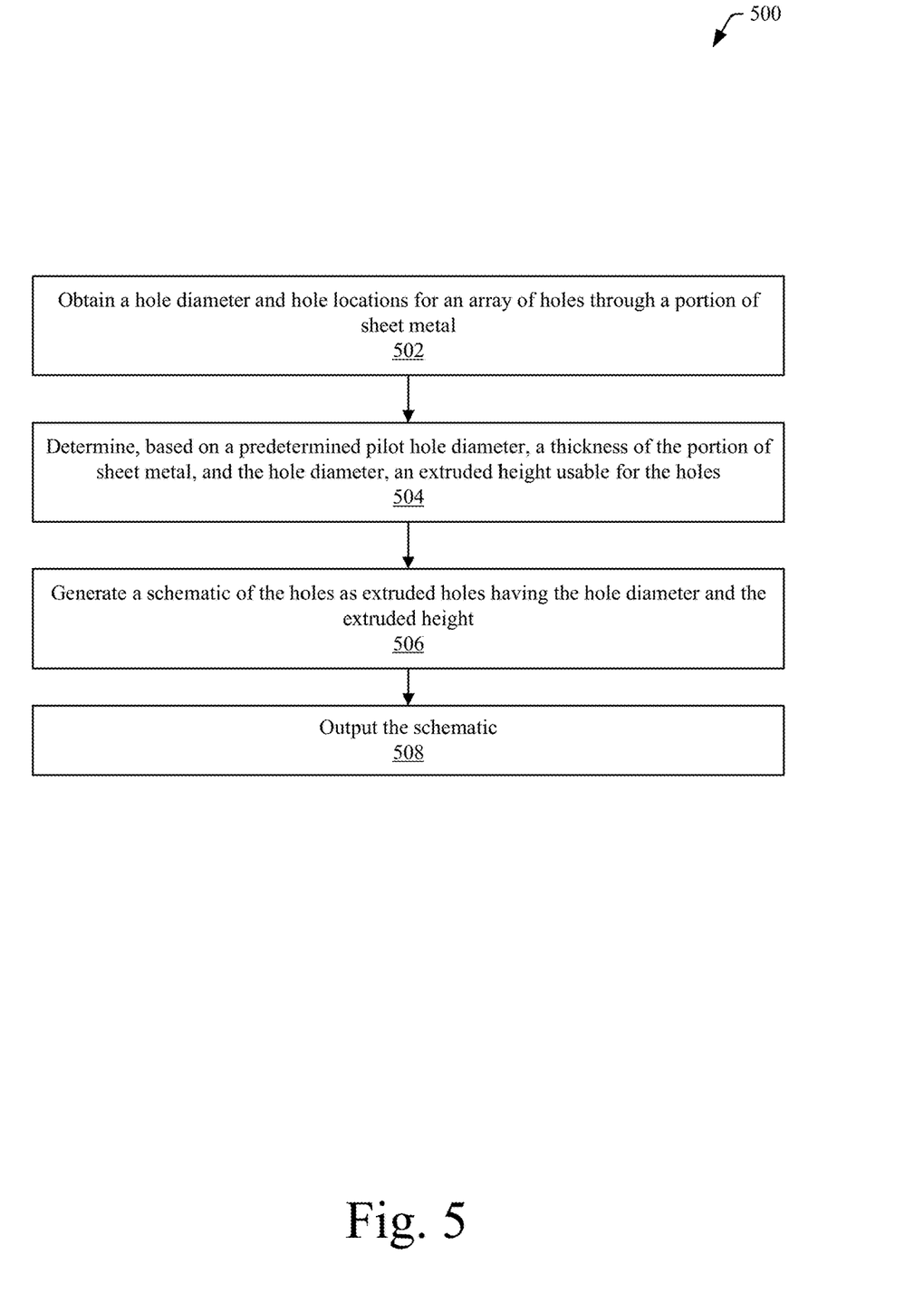
FIG. 5 illustrates, in accordance with this disclosure, an example method of generating a schematic for an array of extruded holes.

FIG. 5 is an example method 500 for generating a schematic of a sheet metal enclosure with an array of extruded heat transfer holes. The example method 500 may be performed by a system including at least one processor, computer-readable storage media (e.g., media, medium, mediums), and an extruded hole array module. The components may be operatively and/or communicatively coupled via a link.

The processor (e.g., application processor, microprocessor, digital-signal processor (DSP), controller) may be coupled to the computer-readable storage media via the link and executes computer-executable instructions (e.g., code) stored within the computer-readable storage media (e.g., non-transitory storage device such as a hard drive, solid-state drive (SSD), flash memory, read-only memory (ROM)) to implement or otherwise cause the extruded hole array module (or a portion thereof) to perform the techniques described below. The extruded hole array may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor and the computer-readable storage media may be any number of components, comprise multiple distributed components, dedicated or shared with other components, modules, or systems, and/or configured differently than described without departing from the scope of this disclosure.

The extruded hole array module may be part of a modeling program (e.g., solid modeling, CAD, parametric modeling). For example, the extruded hole array module may receive a series of inputs from a user indicating a preferred hole diameter and hole locations (e.g., array size, orientation, configuration) for an array of holes and that the holes should be extruded holes and generate a schematic of the array of extruded holes. The schematic may change an existing schematic (e.g., modify one or more hole callouts) or generate a new schematic. The schematic may be a drawing, model, picture, illustration, or any other visual and/or technical representation of the array of extruded holes 108. The schematic may indicate the height 306, the inner diameter 308, the pilot hole diameter 304, and locations of the pilot holes 302. The schematic may show the array of extruded holes 108 and/or include information usable by a manufacturer to produce the array of extruded holes 108 (e.g., callouts).

At 502, a hole diameter and hole locations for an array of holes through a portion of sheet metal is obtained. For example, the system described above may receive a user input indicating the inner diameter 308 and a configuration of the array of extruded holes 108. Alternatively, or in addition, the system may receive dimensions and/or a configuration of an array of thru holes for conversion to extruded holes.

At 504, an extruded height usable for the holes is determined based on a predetermined pilot hole diameter, a thickness of the portion of sheet metal, and the hole diameter. For example, the system may use a conservation of mass function based on an amount of available material between the pilot hole 302 and the inner diameter 308.

At 506, a schematic of the holes as extruded holes having the hole diameter and the extruded height is generated. For example, the system may generate a feature, model, or drawing of the array of extruded holes 108. This can include a modification of an existing schematic or generation of a new schematic.

At 508, the schematic is output. For example, the system may output the feature, model, or drawing of the array of extruded holes 108 for display, modify or create a file corresponding to the array of extruded holes 108, or send the feature, model, or drawing of the array of extruded holes 108 to another program or system.

FURTHER EXAMPLES

Some additional examples of a sheet metal enclosure with an array of extruded heat transfer holes and a method related thereto are provided below.

Example 1

An enclosure comprising: one or more planar portions of sheet metal having corresponding planes; and an array of extruded holes in a planar portion of the planar portions of sheet metal, the extruded holes: having an inner diameter; being configured as apertures for heat transfer through the enclosure; being extruded along an axis normal to a plane of the planar portion; and having a height along the axis relative to the plane.

Example 2

The enclosure of example 1, wherein: the enclosure is an electrical enclosure; and the array of extruded holes is configured for heat transfer from electrical components within the electrical enclosure to a surrounding environment.

Example 3

The enclosure of example 1, wherein the array of extruded holes is a rectangular array of extruded holes.

Example 4

The enclosure of example 1, wherein the enclosure has a rectangular shape, and the planar portion is comprised by a side of the rectangular shape.

Example 5

The enclosure of example 1, wherein the extruded holes extend into the enclosure.

Example 6

The enclosure of example 1, wherein the extruded holes extend out of the enclosure.

Example 7

The enclosure of example 1, wherein the height of the extruded holes corresponds to a maximum allowable height based on a conservation of mass of available material between a pilot hole and an area corresponding to the inner diameter for the extruded holes.

Example 8

The enclosure of example 7, wherein the maximum allowable height is based on a thickness of the planar portion, the inner diameter, and a diameter of the pilot hole.

Example 9

The enclosure of example 8, wherein the diameter of the pilot hole is pre-determined.

Example 10

The enclosure of example 9, wherein the inner diameter is at least three times the diameter of the pilot hole.

Example 11

The enclosure of example 1, wherein the height of the extruded holes is at least one and a half times a thickness of the planar portion.

Example 12

The enclosure of example 1, wherein the enclosure is configured for an automotive environment.

Example 13

The enclosure of example 1, wherein the extruded holes are configured to identify whether the enclosure has been dropped.

Example 14

The enclosure of example 1, wherein the extruded holes are configured to allow for convective heat transfer from inside the enclosure to a surrounding environment.

Example 15

The enclosure of example 1, further comprising another array of other extruded holes in another planar portion of the planar portions of sheet metal, the other extruded holes: having the inner diameter or another inner diameter; being configured as other apertures for heat transfer through the enclosure; being extruded along another axis normal to another plane of the other planar portion; and having the height or another height along the other axis relative to the other plane.

Example 16

The enclosure of example 15, wherein: the planar portion and the other planar portion are formed of a single sheet metal piece; and the other planar portion is perpendicular to the planar portion.

Example 17

A method comprising: obtaining a hole diameter and hole locations for an array of holes through a portion of sheet metal; determining, based on a predetermined pilot hole diameter, a thickness of the portion of sheet metal, and the hole diameter, an extruded height usable for the holes; generating a schematic of the holes as extruded holes having the hole diameter and the extruded height; and outputting the schematic.

Example 18

The method of example 17, wherein the schematic is a parametric model of the array of holes.

Example 19

The method of example 17, wherein the portion of sheet metal is a planar portion of sheet metal.

Example 20

The method of example 17, wherein the extruded height is a maximum allowable height based on a conservation of mass of available material between a pilot hole and an area corresponding to the hole diameter for the extruded holes.

Example 21

A system configured to perform the method of any of examples 17-20.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An enclosure comprising:
   one or more planar portions of sheet metal having corresponding planes; and
   an array of extruded holes in a planar portion of the planar portions of sheet metal, the extruded holes:
     having an inner diameter;
     being configured as apertures for heat transfer through the enclosure;
     being extruded along an axis normal to a plane of the planar portion; and
     having a height along the axis relative to the plane;
   wherein sidewalls of the extruded holes have a wall thickness that is less than a sheet metal thickness of the planar portions of the sheet metal to configure the sidewalls as visual drop indicators that introduce a visual indication of a failure resulting from the enclosure being dropped or otherwise damaged.

2. The enclosure of claim 1, wherein:
   the enclosure is an electrical enclosure; and
   the array of extruded holes is configured for heat transfer from electrical components within the electrical enclosure to a surrounding environment.

3. The enclosure of claim 1, wherein the array of extruded holes is a rectangular array of extruded holes.

4. The enclosure of claim 1, wherein the enclosure has a rectangular shape, and the planar portion is comprised by a side of the rectangular shape.

5. The enclosure of claim 1, wherein the extruded holes extend into the enclosure.

6. The enclosure of claim 1, wherein the extruded holes extend out of the enclosure.

7. The enclosure of claim 1, wherein the height of the extruded holes corresponds to a maximum allowable height based on a conservation of mass of available material between a pilot hole and an area corresponding to the inner diameter for the extruded holes.

8. The enclosure of claim 7, wherein the maximum allowable height is based on a thickness of the planar portion, the inner diameter, and a diameter of the pilot hole.

9. The enclosure of claim 8, wherein the diameter of the pilot hole is pre-determined.

10. The enclosure of claim 9, wherein the inner diameter is at least three times the diameter of the pilot hole.

11. The enclosure of claim 1, wherein the height of the extruded holes is at least one and a half times a thickness of the planar portion.

12. The enclosure of claim 1, wherein the enclosure is configured for an automotive environment.

13. The enclosure of claim 1, wherein the extruded holes are configured to allow for convective heat transfer from inside the enclosure to a surrounding environment.

14. The enclosure of claim 1, further comprising another array of other extruded holes in another planar portion of the planar portions of sheet metal, the other extruded holes:
   having the inner diameter or another inner diameter;
   being configured as other apertures for heat transfer through the enclosure;
   being extruded along another axis normal to another plane of the other planar portion; and
   having the height or another height along the other axis relative to the other plane.

15. The enclosure of claim 14, wherein:
   the planar portion and the other planar portion are formed of a single sheet metal piece; and
   the other planar portion is perpendicular to the planar portion.

* * * * *